3,468,911
**3,11,17 - TRISUBSTITUTED - C - NORANDROSTANE-
11α,17-LACTONES**
Paul Kurath, Waukegan, Ill., assignor to Abbott Laboratories, North Chicago, Ill., a corporation of Illinois
No Drawing. Filed May 23, 1966, Ser. No. 551,911
Int. Cl. C07c *173/00, 171/06, 169/22*
U.S. Cl. 260—343.3                     5 Claims

ABSTRACT OF THE DISCLOSURE

Simple 3,11α-disubstitted 17β-hydroxy-C-nor-5β-androstane 11α,17-lactones are prepared from analogous 11-oxo - 12 - hydroxy (or acyloxy)-or 11-hydroxy-12-oxo-$\Delta^{9(11)}$-androstanes. The new compounds are useful androgens at very low dosages.

---

The present invention is directed to new steroids; more particularly, it is directed to 3,11,17-trisubstituted-C-norandrostane 11α,17-lactones.

The new compounds have a structure of the formula

I

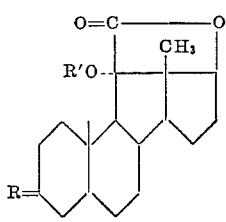

wherein R is oxygen or

and wherein R' is hydrogen or a lower fatty acid acyl group. The invention is also directed to new steroid intermediates of the formula

II

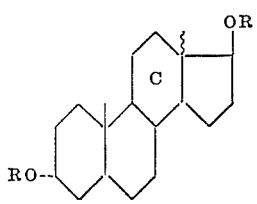

wherein the C ring has a partial configuration of

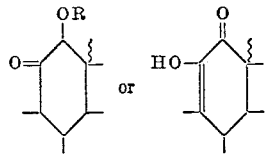

and wherein each R is hydrogen or acetyl. The angular methyl group at the carbon atom in the 13-position may be in the α- or β-position (as indicated by the wavy line). However, the lactones of structure I must have an all-cis fusion of the three 5-membered rings. It will be readily appreciated by those skilled in the steroid art that the above compounds of Formula II have several position- and stereo-isomers which are all intended to be included in the scope of this invention.

The novel γ-lactones of Formula I show hormonal activity producing androgenic effects in warm-blooded animals when administered subcutaneously in a dosage between 0.25 and 2.5 mg./kg./day. The intermediates of Formula II, on the other hand, have antiandrogenic activity showing depression of growth of the seminal visicles and dorsal prostate.

In a general embodiment, the intermediates of Formula II are prepared by treating an 11-bromo-3,17-diacyloxy-12-oxo-5β-androstane (made by the procedure of Julian et al. described in U.S. 2,940,991) with a 5- to 25-fold excess of an alkali hydroxide in aqueous alcohol at a temperature below 100° C. for a period of between 10 minutes and 2 hours, removing the alcohol and replacing it with water. The 11-oxo-3α,12β,17β-trihydroxy-5β-androstane precipitates and can be oxidized to 3α,17β-diacetoxy - 11 - hydroxy-12-oxo-5β-androst-9(11)-ene or it can be acylated in known fashion by treating it with a lower fatty acid anhydride in the presence of an acid binder. The starting material used in this process may carry the bromo group in the 11α-position or, equally practical, a mixture of the 11α- and 11β-bromo compounds may be used.

In order to show specific embodiments of the present invention reference is made to the following examples which are illustrations only. In these examples, when two solvents are mentioned without giving a ratio thereafter, it is to be understood that the first-named solvent is used to dissolve the compound and the second solvent is added to the concentrated solution in the solvent to induce or to complete crystallization. Where a ratio is given, the solvents are used in that combination initially. Also, all rotations given are those measured with chloroform as the solvent.

EXAMPLE 1

11-oxo-3α,12β,17β-trihydroxy-5β-androstane

A mixture of 8.323 g. of 11α- and 11β-bromo-3α,17β-diacetoxy-12-oxo-5β-androstane and 9.5 g. of sodium hydroxide pellets are dissolved in 230 ml. of methanol and 28 ml. of water. The mixture is stirred and warmed to a gentle reflux for one hour and agitation is continued at room temperature for 2 additional hours before the methanol is gradually evaporated under reduced pressure on a steam bath while a total of 700 ml. of water is added in portions. The resulting slurry is cooled and the formed precipitate is collected on a filter, washed with several small amounts of water and dried overnight at 70° C. under reduced pressure. The crude 11-oxo-3α,12β, 17β - trihydroxy-5β-androstane is recrystallized several times from acetone to produce 2.271 g. (34% of theory) of the pure material. An analytical sample melts at 235–236° C. and has an $[\alpha]_D^{27}$ of +52°. An additional amount of product is isolated from the above mother liquor.

EXAMPLE 2

11-oxo-3α,12β,17β-triacetoxy-5β-androstane

A mixture of 0.325 g. of the compound prepared in Example 1, 6 ml. of pyridine and 6 ml. of acetic anhydride is allowed to stand overnight at room temperature. The solution is evaporated to dryness under reduced pressure and the residue is dissolved in ether, washed in series with water, saturated sodium bicarbonate solution, water, dilute hydrochloric acid and water, and worked up in a standard manner to give, after recrystallization from acetone/heptane, 0.308 g. of 11-oxo-3α,12β,17β-triacetoxy-5β-androstane. A second crop of the material weighs 0.103 g. An analytical sample melts at 155–156° C. and has an $[\alpha]_D^{24}$ of +11°.

By replacing the acetic anhydride used above with an equimolar amount of butyryl chloride, 11-oxo-3α,12β, 17β-tributyroxy-5β-androstane is obtained.

EXAMPLE 3

3α,17β-diacetoxy-11-hydroxy-12-oxo-5β-androst-9(11)-ene

A mixture of 4.49 g. of 11-oxo-3α,12β,17β-trihydroxy-5β-androstane, 8.85 g. of bismuth trioxide and 155 ml. of glacial acetic acid is stirred and warmed to a gentle reflux for 22 hours. After cooling, the precipitate is collected on a filter and the filtrate is washed with 1200 ml. of chloroform. The chloroform wash liquor is combined with the acetic acid filtrate and the mixture is washed with 500 ml. of water. The layers are separated and the aqueous phase is extracted with two 1200 ml. portions of chloroform. The three chloroform extracts are washed to neutrality with several portions of water, dried over anhydrous magnesium sulfate, filtered, combined and evaporated to leave a residue of 5.864 g. of the crude 3α,17β-diacetoxy-11-hydroxy-12-oxo-5β-androst-9(11)-ene. This product is purified by placing it on a chromatographic column containing 500 g. of silica gel. From the benzene-ethyl acetate (9:1) eluate, 3.383 g. of a solid is recovered. Recrystallization of this solid from acetone produces 1.917 g. (34% theory) of 3α,17β-diacetoxy-11-hydroxy-12-oxo-5β-androst-9(11)-ene (melting at 247–249° C. A second crop of material of 0.134 g. is recovered from the crystallization medium. An analytical sample of the material analyzes correctly for the compound of formula $C_{23}H_{32}O_6$; it melts at 247–248° C. and has an $[\alpha]_D^{26}$ of +108°. Infrared absorption maxima in chloroform are found at 3400, 1725, 1667 and 1600 cm.$^{-1}$. The ultraviolet absorption was found to be at 282 mμ (ε=9600).

EXAMPLE 4

11β-carboxy-3α,11α,17β-trihydroxy-13-iso-C-nor-5β-androstane 11a,17-lactone

A mixture containing 1.717 g. of 3α,17β-diacetoxy-11-hydroxy-12-oxo-5β-androst-9(11)-ene, 13.3 g. of potassium hydroxide pellets, 300 ml. of n-propanol and 30 ml. of water is stirred in an atmosphere of nitrogen under a gentle reflux for 18 hours. The mixture is then diluted with 380 ml. of water and the solution is concentrated by evaporation under reduced pressure to about 400 ml. The cooled concentrate is made acidic by the addition of 750 ml. of 2 N hydrochloric acid and the slurry is extracted with three 750-ml. portions of ether. The ether extracts are washed to neutrality with water, dried over anhydrous magnesium sulfate, filtered and evaporated, leaving 1.387 g. of crude 11β-carboxy-3α,11α,17β-trihydroxy-13-iso-C-nor-5β-androstane 11a,17-lactone. The product is chromatographed on 150 g. of silica gel. The benzene-ethyl acetate (1:1) eluates give, after evaporation of the solvent, a residue of 0.966 g. of the product which is recrystallized once from benzene and once from acetone/heptane to give a first crop of 0.560 g. of the pure product. Concentration of the mother liquors produces a second crop of 0.310 g. which is sublimed under high vacuum at 170° to yield, after recrystallization from acetone/heptane, 0.206 g. of the compound which is thus obtained in a yield of 56% of theory. An analytical sample of the material melts at 187–188° C., has an $[\alpha]_D^{26}$ of —76°, and shows infrared absorption maxima in chloroform at 3600 and 1755 cm.$^{-1}$.

EXAMPLE 5

11β-carboxy-3α,11α-diacetoxy-17β-hydroxy-13-iso-C-nor-5β-androstane 11a,17-lactone A mixture of 0.200 g. of 11β-carboxy-3α,11α,17β-trihydroxy-13-iso-C-nor-5β-androstane 11a,17-lactone, 2 ml. of pyridine and 2 ml. of acetic anhydride is allowed to stand at room temperature for 2 days. The solution is evaporated to dryness under reduced pressure and the residue is dissolved in ether. The ether solution is washed in series with 2 N hydrochloric acid, water, saturated sodium bicarbonate solution, and water. The ether is then dried over anhydrous magnesium sulfate, filtered and evaporated to leave 0.209 g. of 11β-carboxy-3α,11α-diacetoxy-17β-hydroxy-12-iso-C-nor-5β-androstane 11a,17-lactone. Recrystallization of this material from acetone/heptane produces 0.151 g. of the pure product melting at 179–180° C. with $[\alpha]_D^{26}$ of —82°. A second crop of 0.041 g. of the material is obtained from concentrating the mother liquors.

EXAMPLE 6

11β-carboxy-11α,17β-dihydroxy-3-oxo-13-iso-C-nor-5β-androstane 11a,17-lactone A solution of 0.245 g. of 11β-carboxy-3α,11α,17β-trihydroxy-13-iso-C-nor-5β-androstane 11a,17-lactone in 40 ml. of acetone is cooled to 5° at which time 0.8 ml. of the chromium trioxide reagent (described by Bowden in J. Chem. Soc., 39 of 1946) is added under an atmosphere of nitrogen and after 15 minutes of swirling, the reaction mixture is diluted with 660 ml. of water. The aqueous phase is extracted with 1000 ml. of ether and subsequently with two 600-ml. portions of ether. The ether extracts are washed with small portions of water, dried over anhydrous magnesium sulfate, filtered, combined, and the ether is evaported to leave a residue of 0.233 g. of crude 11β-carboxy-11α,17β-dihydroxy-3-oxo-13-iso-C-nor-5β-androstane 11a,17-lactone. The substance is recrystallized from acetone/heptane to yield 0.117 g. of the pure ketone melting at 247–249° C. and showing an $[\alpha]_D^{26}$ of —59°. A second crop of 0.08 g. is obtained from the mother liquor and melts at 242–244° C.

EXAMPLE 7

11α-acetoxy-11β-carboxy-17β-hydroxy-3-oxo-13-iso-C-nor-5β-androstane 11a,17-lactone By following the procedure of Example 5 and using as the starting material 0.096 g. of 11β-carboxy-11α,17β-dihydroxy-3-oxo-13-iso-C-nor-5β-androstane 11a,17-lactone, 1 ml. of pyridine and 1 ml. of acetic anhydride, 0.05 g. of 11α-acetoxy-11β-carboxy-17β-hydroxy-3-oxo-13-iso-C-nor-5β-androstane 11a,17-lactone is obtained after recrystallization from acetone/heptane which shows a melting point of 176–178° C. and an $[\alpha]_D^{26}$ of —97°.

By replacing the acetic anhydride used above with propionic acid anhydride, the above procedure yields 11β - carboxy - 17β - hydroxy - 3 - oxo - 11β - propionoxy-13-iso-C-nor-5β-androstane 11a,17-lactone.

Others may practice the invention in any of the numerous ways which will be apparent to those skilled in the art by the present disclosure.

I claim:
1. A steroid of the formula

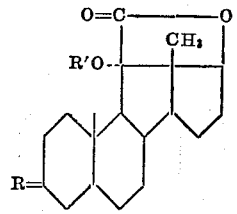

wherein R is oxygen or

and wherein R' is hydrogen or lower fatty acid acyl.
2. The steroid of claim 1 wherein R is

and R' is hydrogen.

3. The steroid of claim 1 wherein R is lower fatty acid acyl
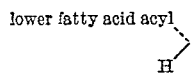
and R' is acetyl.
4. The compound of claim 1 wherein R is oxygen and R' is hydrogen.
5. The compound of claim 1 wherein R is oxygen and R' is lower fatty acid acyl.
References Cited
UNITED STATES PATENTS
2,940,991 2/1961 Julian et al. _____ 260—397.45
2,986,567 5/1961 Reichstein et al. _ 260—343.3 X
ALEX MAZEL, Primary Examiner
J. A. NARCAVAGE, Assistant Examiner
U.S. Cl. X.R.
260—397.45; 424—279